United States Patent
Zhang et al.

(10) Patent No.: US 11,382,330 B2
(45) Date of Patent: Jul. 12, 2022

(54) MICRO-ENCAPSULATION OF AN INSECTICIDE

(71) Applicant: Dow Global Technologies LLC, Midland, MI (US)

(72) Inventors: Shiling Zhang, Shanghai (CN); Ling Zhong, Shanghai (CN); Hua Ren, Shanghai (CN); Dong Yun, Shanghai (CN); Wei Lu, Shanghai (CN); Cuilan Chang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/957,404

(22) PCT Filed: Dec. 25, 2017

(86) PCT No.: PCT/CN2017/118220
§ 371 (c)(1),
(2) Date: Jun. 24, 2020

(87) PCT Pub. No.: WO2019/126922
PCT Pub. Date: Jul. 4, 2019

(65) Prior Publication Data
US 2020/0375187 A1 Dec. 3, 2020

(51) Int. Cl.
*A01N 43/90* (2006.01)
*A01N 25/04* (2006.01)
*A01N 25/28* (2006.01)

(52) U.S. Cl.
CPC ............ *A01N 43/90* (2013.01); *A01N 25/04* (2013.01); *A01N 25/28* (2013.01)

(58) Field of Classification Search
CPC . A01N 3/90; A01N 25/22; C05G 3/90; C05G 5/35; C05G 3/08
See application file for complete search history.

(56) References Cited

U.S. PATENT DOCUMENTS

| 8,491,928 B2 | 7/2013 | Mallard et al. |
| 9,295,249 B2 | 3/2016 | Casana et al. |
| 10,544,066 B2 | 1/2020 | Hiteshkumar et al. |

| 2006/0147485 A1 | 7/2006 | Pedersen et al. |
| 2012/0070482 A1 | 3/2012 | Heming et al. |
| 2012/0220456 A1 | 8/2012 | Casana et al. |

FOREIGN PATENT DOCUMENTS

| CN | 1209022 | 7/2005 | |
| CN | 1663379 | 9/2005 | |
| CN | 1817135 | 8/2006 | |
| CN | 100486437 | 5/2009 | |
| CN | 102106345 | 6/2011 | |
| CN | 102893985 | 1/2013 | |
| CN | 104365595 | 2/2015 | |
| CN | 104621102 | 5/2015 | |
| CN | 105010362 | 11/2015 | |
| CN | 105147641 | 12/2015 | |
| CN | 106376601 | 2/2017 | |
| CN | 106818734 | 6/2017 | |
| WO | WO2016108928 | * 7/2016 | ............. C05C 11/00 |

OTHER PUBLICATIONS

International Search Report & Written Opinion for related PCT Application PCT/CN2017/118220, dated Sep. 29, 2018 (10 pgs).
International Preliminary Report on Patentability for related PCT Application PCT/CN2017/118220, dated Apr. 17, 2020 (6 pgs).

* cited by examiner

*Primary Examiner* — Walter E Webb
(74) *Attorney, Agent, or Firm* — Brooks, Cameron & Huebsch, PLLC

(57) ABSTRACT

An organic/oil mixture used in an emulsion to form microcapsules of the present disclosure. The organic/oil mixture includes abamectin; a non-polar solvent having a polarity (P) value of a Hansen solubility parameter of 0 to 3; a polar solvent of Formula (I): where $R_1$ is a C1 to C15 alkyl; $R_2$ is either H or a C1 to C8 alkyl; $R_3$ is a C1 to C15 alkylene; and $R_4$ is a C1 to C15 alkyl, where a sum of carbons in the $R_1$, $R_2$, $R_4$ alkyls and $R_3$ alkylene is 8 to 30; and 2.5 to 20 wt. % of an isocyanate, where each wt. % is based on the total weight of the organic/oil mixture and the sum of the wt. % of the abamectin, the non-polar solvent, the polar solvent and the isocyanate totals 100 wt. %.

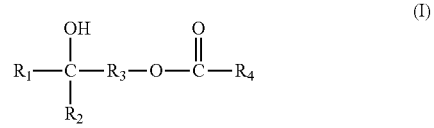

(I)

19 Claims, No Drawings

MICRO-ENCAPSULATION OF AN INSECTICIDE

This application is a National Stage Application under 35 U.S.C. § 371 of International Application Number PCT/CN2017/118220, filed Dec. 25, 2017 and published as WO 2019/126922 on Jul. 4, 2019, the entire contents of which are incorporated herein by reference in its entirety

TECHNICAL FIELD

The present disclosure relates to micro-encapsulation and more specifically to the micro-encapsulation of an insecticide.

BACKGROUND

Abamectin is widely used to control insect and mite pests in a range of agronomic, fruit, vegetable and ornamental crops. Abamectin, however, has undesirable characteristics: first, it is highly photosensitive and prone to oxidation; and second, it is toxic to humans and animals.

Attempts to address the problem of photosensitivity and oxidation have taken different approaches. For example, abamectin is sold as an emulsion concentrate (EC) (e.g., a concentration of 18 g/L) that includes antioxidants and/or ultraviolet screening agents that help to minimize the photodecomposition of the abamectin. Alternatively, the photosensitivity issue of abamectin has been addressed by micro-encapsulating the abamectin using an emulsion process. The emulsion process of micro-encapsulation starts by emulsifying an oil phase containing the abamectin and a hydrophobic solvent(s) in a water phase containing surfactants) and dispersant(s). Micro-capsules are then formed around the oil droplets in the emulsion via monomer polymerization.

Keys for the first step of micro-encapsulation, however, include making an active solution with solvents that have good compatibility and solubility with the suspension system so as to achieve a targeted active loading level. The suspension system also needs good hydrophobicity so as to facilitate the micro-capsule formation. Abamectin solubility in typical hydrophobic aromatic agricultural solvents, however, is very low. For example, achieving loading levels of even 1 weight percent of abamectin in a micro-capsule is difficult.

Another issue that creates difficulty in micro-encapsulating abamectin is the chemistry used in the micro-encapsulation process. The typical micro-encapsulation process uses an interfacial polymerization process that is based on polyurea/polyurethane chemistry. This chemistry uses isocyanate monomer to create the micro-capsule wall. Abamectin, however, has hydroxyl groups (one secondary hydroxyl group and two tertiary hydroxyl groups), as seen in Formula I below. These hydroxyl groups can react with the isocyanate monomer, which can result in the degradation of abamectin during micro-capsule formation.

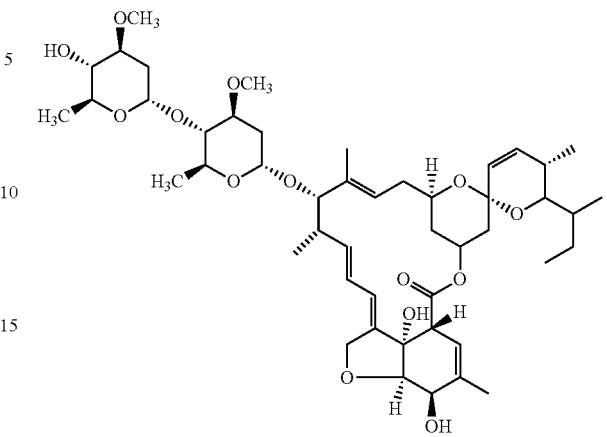

Formula I

As such, there is a need in the art to improve the micro-encapsulation of abamectin.

SUMMARY

The present disclosure provides for improvements in the micro-encapsulation of abamectin. The present disclosure provides, among other things, an active solution with solvents that have good abamectin solubility, that achieve target abamectin loading levels (levels of 3 to 5 weight percent) and that have good hydrophobicity so as to facilitate capsule formation all while minimizing the degradation of abamectin during capsule formation process. Specifically, it has been surprisingly discovered that the use of specific polar solvents in conjunction with non-polar solvents in what is referred to as an organic/oil mixture (discussed herein) result in micro-capsules that contain abamectin at a weight percent that is comparable to the weight percent of the abamectin in the organic/oil mixture used in forming the micro-capsules. In other words, the weight percent of abamectin in the micro-capsules is surprisingly close to the weight percent of the abamectin in the organic/oil mixture used in forming the micro-capsules, demonstrating that abamectin is surprisingly well protected during the encapsulation reaction.

As mentioned above, embodiments of the present disclosure include an organic/oil mixture used in forming an emulsion that is used in forming the micro-capsules of the present disclosure. The organic/oil mixture includes 0.1 to 20 weight percent (wt. %) of abamectin; 10 to 70 wt. % of a non-polar solvent having a polarity (P) value of a Hansen solubility parameter of 0 to 3; 0.5 to 80 wt. % of a polar solvent of Formula I:

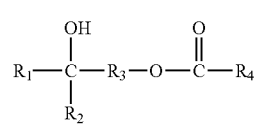

Formula I where $R_1$ is a C1 to C15 alkyl; $R_2$ is either H or a C1 to C8 alkyl; $R_3$ is a C1 to C15 alkylene; and $R_4$ is a C1 to C15 alkyl, where a sum of carbons in the $R_1$, $R_2$, $R_4$ alkyls and $R_3$ alkylene is 8 to 30; and 2.5 to 20 wt % of an isocyanate, where each wt. % is based on the total weight of the organic/oil mixture and the sum of the wt. % of the abamectin, the non-polar solvent, the polar solvent and the isocyanate totals 100 wt. %.

The organic/oil mixture is used in an emulsion, where the emulsion includes the organic/oil mixture and an aqueous mixture. The organic/oil mixture of the emulsion includes 0.1 to 10 weight percent (wt. %) of abamectin; 10 to 30 wt. % of the non-polar solvent; 0.5 to 30 wt. % of the polar solvent of Formula I:

$$R_1\text{—}\underset{\underset{R_2}{|}}{\overset{\overset{OH}{|}}{C}}\text{—}R_3\text{—}O\text{—}\overset{\overset{O}{\|}}{C}\text{—}R_4 \quad \text{Formula I}$$

where $R_1$ is a C1 to C15 alkyl; $R_2$ is either H or a C1 to C8 alkyl; $R_3$ is a C1 to C15 alkylene; and $R_4$ is a C1 to C15 alkyl, where a sum of carbons in the $R_1$, $R_2$, $R_4$ alkyls and $R_3$ alkylene is 8 to 30; and 2.5 to 10 wt. % of the isocyanate. The aqueous mixture includes 0.5 to 20 wt. % of a surfactant; 0.5 to 20 wt. % of a dispersant; 0.01 to 2 wt. % of a thickener; and 40 to 55 wt. % of water, where each wt. % of the emulsion is based on the total weight of the emulsion and the sum of the wt. % of the organic/oil mixture and the aqueous mixture totals 100 wt %.

Preferably, $R_1$ is a C1 to C8 alkyl; $R_3$ is a C1 to C8 alkylene; and $R_4$ is a C1 to C8 alkyl. Preferably, a sum of carbons in the $R_1$, $R_2$, $R_4$ alkyls and $R_3$ alkylene is 10 to 25. Most preferably, the polar solvent is 2,2,4-trimethyl-1,3-pentanediol monoisobutyrate.

As noted herein, the non-polar solvent has a polarity (P) value of a Hansen solubility parameter of 0 to 3, where such non-polar solvents are selected from the group consisting of an aromatic petroleum derivative, a vegetable oil, a hydrocarbon, an ester, an amide, and combinations thereof. In one preferred embodiment, the non-polar solvent is Solvesso™ 150 # (ExxonMobil Co.), which is an aromatic petroleum derivative.

For the various embodiments, the isocyanate is selected from the group consisting of methylene diphenyldiisocyanate (MDI), polymeric MDI, hexamethylenediisocyanate toluenediisocyanate (TDI), 1,5-naphthalene diisocyanate (IDI), methylene bicyclohexylisocyante (HMDI), isophoronediisocyanate (IPDI) and combinations thereof.

For the aqueous mixture, the surfactant is a branched alcohol alkoxyate. The dispersant is an acrylate based dispersant polymer. The thickener is selected from the group consisting of a natural polysaccharide, an inorganic silicate, a synthetic polymer, a clay or a combination thereof.

The present disclosure also includes a micro-capsule that includes a coating formed from the reaction of an amine with the isocyanate in the emulsion, as provided herein, and a liquid mixture contained inside the coating forming the micro-capsule, where the liquid mixture includes the abamectin, the non-polar solvent, the polar solvent the surfactant, the dispersant, the thickener and water. The micro-capsule is suspended in the aqueous mixture.

DETAILED DESCRIPTION

The present disclosure provides for improvements in the micro-encapsulation of abamectin. The present disclosure provides, among other things, an active solution with solvents that have good abamectin solubility, that achieve target abamectin loading levels (levels of 3 to 5 weight percent) and that have good hydrophobicity so as to facilitate capsule formation all while minimizing the degradation of abamectin during capsule formation process. Specifically, it has been surprisingly discovered that the use of specific polar solvents in conjunction with non-polar solvents in what is referred to herein as an organic/oil mixture allows for micro-capsules that contain abamectin at a weight percent that is comparable to the weight percent of the abamectin in the organic/oil mixture used in forming the micro-capsules. In other words, the weight percent of abamectin in the micro-capsules is surprisingly close to the weight percent of the abamectin in the organic/oil mixture used in forming the micro-capsules, demonstrating that abamectin is surprisingly well protected during the encapsulation reaction.

As provided herein, the organic/oil mixture is used with an aqueous mixture to form an emulsion. An amine is added to the emulsion, where through a process of interfacial polymerization the amine reacts with an isocyanate present in the organic/oil mixture to form a coating around the organic/oil mixture and thereby form the micro-capsules of the present disclosure. A liquid mixture contained inside the coating forming the micro-capsule includes the abamectin.

Organic/Oil Mixture

Embodiments of the present disclosure include the organic/oil mixture used n forming the emulsion that is subsequently used in forming the micro-capsules of the present disclosure. The organic/oil mixture includes 0.1 to 20 weight percent (wt. %) of abamectin; 10 to 70 wt. % of a non-polar solvent having a polarity (P) value of a Hansen solubility parameter of 0 to 3; 0.5 to 80 wt. % of a polar solvent of Formula I:

$$R_1\text{—}\underset{\underset{R_2}{|}}{\overset{\overset{OH}{|}}{C}}\text{—}R_3\text{—}O\text{—}\overset{\overset{O}{\|}}{C}\text{—}R_4 \quad \text{Formula I}$$

where $R_1$ is a C1 to C15 alkyl; $R_2$ either H or a C1 to C8 alkyl; is a C1 to C15 alkylene; and $R_4$ is a C1 to C15 alkyl, where a sum of carbons in the $R_1$, $R_2$, $R_4$ alkyls and $R_3$ alkylene is 8 to 30; and 2.5 to 20 wt. % of an isocyanate, where each wt. % is based on the total weight of the organic/oil mixture and the sum of the wt. % of the abamectin, the non-polar solvent, the polar solvent and the isocyanate totals 100 wt. %.

The organic/oil mixture includes 0.1 to 20 wt. % of abamectin, where the wt. % is based on the total weight of the organic/oil mixture. Preferably, the organic/oil mixture includes 0.1 to 10 wt. % of abamectin. In one preferred embodiment, the organic/oil mixture includes 3 to 5 wt. % of abamectin. Abamectin (CAS Registration Number 71751-41-2) is a mixture of avermecins containing greater than 80 wt. % ivermectin B1a (CAS Registration Number 65195-55-3) and avermectin B1b (CAS Registration Number 65195-56-4) making up the remainder (i.e., to 100 wt. %). Abamectin is an insecticide derived from the soil bacterium *Streptomyces avermitilis*. Abamectin can be acquired commercially from HeBei Veyong Bio-Chemical Co., Ltd, among other sources.

While the present disclosure uses abamectin, it is understood that other biologically active compounds, besides abamectin, having similar hydroxyl groups to abamectin can be used with the organic/oil mixture in forming the emulsion and the micro-capsules of the present disclosure. Such biologically active compounds can include, but are not limited to, macrocyclic lactones comprise the avermectins (ivermectin, abamectin and doramectin) and the milbemycins (milbemyin oxime and moxidectin), among others.

The organic/oil mixture also includes 10 to 70 wt. % of a non-polar solvent having a polarity (P) value of a Hansen solubility parameter of 0 to 3, where the wt. % is based on the total weight of the organic/oil mixture. Preferably, the organic/oil mixture includes 20 to 60 wt. % of the non-polar solvent. Generally, useful non-polar solvents for the present disclosure include, but are not limited to, agriculturally acceptable hydrophobic solvents with low water solubility (e.g., less than 0.1% by weight) at room temperature (e.g., 2.3° C.) and with a polarity (P) value of a Hansen solubility parameter of 0 to 3. As used herein, the polarity (P) values for the Hansen solubility parameter are calculated using software that is available on the Hansen Solubility Parameter website (https://www.hansen-solubility.com/buy-HSPiP-software.php). Polarity (P) values for the Hansen Solubility Parameter can also be calculated based on *Hansen Solubility Parameters: A user's handbook*, Second Edition, Boca Raton, Fla.: CRC Press. ISBN 978-0-8493-7248-3. Polarity values for the Hansen solubility parameter provided herein are measured at room temperature (23° C.).

Such non-polar solvents are selected from the group consisting of an aromatic petroleum derivative, a vegetable oil, a hydrocarbon, an ester, an amide and combinations thereof. Examples of the aromatic petroleum derivative include those commercially available from ExxonMobil or British Petroleum under the trade designators Solvesso™ 100, Solvesso™ 150, Solvesso™ 200, Solvesso™ 150ND, SolvessO™ 200ND, Aromatic™ 150, Aromatic™ 700, Hydrosol™ A 200, Hydrosol™ A 230/270, Caromax™ 20, Caromax™ 28, Aromat™ K 150, Aromat™ K 200 and Shellsol™ A 150, among others. In one preferred embodiment, the non-polar solvent is Solvesso™ 150 # (Exxon-Mobil Co.), which is an aromatic petroleum derivative. Examples of vegetable oils include soya oil, rapeseed oil, palm oil and corn oil, among others. Examples of hydrocarbons include pentanes, hexanes and the like, linear paraffin, isoparaffin and cycloparaffins. Examples of esters include, but are not limited to, terpenoid esters, benzylacetate, benzyl benzoate. Examples of amides include N,N-dialkylamides commercially available as Hallcomide M 810 from The P.C. Hall Co., Genagen 4166 from Clariant Corporation. Combinations of any of the above non-polar solvents can also be used.

The organic/oil mixture also includes 0.5 to 80 wt. % of the polar solvent of Formula I, where the wt. % is based on the total weight of the organic/oil mixture. Preferably, organic/oil mixture includes 10 to 70 wt. % of the polar solvent. The polar solvent of the present disclosure, in contrast to the non-polar solvent, has a polarity (P) value of a Hansen solubility parameter of greater than 3 to 10, as measured/calculated according to the methods discussed herein for the non-polar solvent. As noted above, the polar solvent is shown in Formula I:

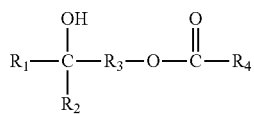

Formula I where $R_1$ is a C1 to C15 alkyl; $R_2$ is either H or a C1 to C8 alkyl; $R_3$ is a C1 to C15 alkylene; and $R_4$ is a C1 to C15 alkyl, where a sum of carbons in the $R_1$, $R_2$, $R_4$ alkyls and $R_3$ alkylene is 8 to 30; and 2.5 to 20 wt. % of an isocyanate, where each wt. % is based on the total weight of the organic/oil mixture and the sum of the wt. % of the abamectin, the non-polar solvent, the polar solvent and the isocyanate totals 100 wt. %. Preferably, $R_1$ is a C1 to C8 alkyl; $R_4$ is a C1 to C8 alkyl; and $R_3$ is a C1 to C8 alkylene. Preferably, a sum of carbons in the $R_1$, $R_2$, $R_3$ and $R_4$ alkyls is 10 to 25. Most preferably, the polar solvent is 2,2,4-trimethyl-1,3-pentanediol monoisobutyrate (IBT).

The use of the polar solvent, as provided herein, helps to protect the abamectin from decomposition during the formation of the micro-capsules. Specifically, the hydroxyl groups in the polar solvent help to reduce the degradation of abamectin that might be caused by reactions between the isocyanate group and the hydroxyl group in the abamectin. The polar solvent also helps to form a stable emulsion and suspension of the micro-capsules even under cold and heat aging tests and ultraviolet light stability tests, as seen in the Examples section below.

Examples of suitable polar solvents for the present disclosure also include, but are not limited to, solvents having similar solubility parameters to the ester alcohols seen above. Examples of such polar solvents include butyl formate (CAS 592-84-7), diethylene glycol hexyl ether (CAS 112-59-4), dipropylene glycol mono n-butyl ether (CAS 29911-28-2), ethylene glycol mono ethyl ether acrylate (CAS 106-74-1), meclofenoxate (CAS 51-68-3), methanol cluster (CAS 67-56-1), methyl acrylate (CAS 96-33-3), propylene glycol monomethyl ether acetate (CAS 108-65-6), propylene glycol monopropyl ether (CAS 1569-01-3), 2,2,4-trimethyl-1,3-pentanediol monoisobutyrate (CAS 25265-77-4), vinyl crotonate (CAS 14861-06-4), vinyl formate (CAS 692-45-5), 2,2,3,4,4,4-hexafluorobutan-1-ol (CAS 382-31-0), 1,1,1-trifluoro-2-methylpropan-2-ol (CAS 507-52-8), 1-pentanol, 2,2,3,3,4,4,5,5-octafluoro (CAS 355-80-6), ethyl 2-methyl-3-hydroxy-4,4,4-trifluorobutyrate (CAS 91600-33-8) and propylene glycol 2-tert-butyl ether (CAS 94023-15-1).

The organic/oil mixture also includes 2.5 to 30 wt. % of the isocyanate, where the wt. % is based on the total weight of the organic/oil mixture. Preferably, organic/oil mixture includes 5 to 20 wt. % of the isocyanate. The isocyanate of the present disclosure can include, but are not limited to, methylene diphenyldiisocyanate (MDI), polymeric MDI (PDMI), hexamethylenediisocyanate (HDI), toluenediisocyanate (TDI), 1,5-naphthalene diisocyanate (NDI), methylene bicyclohexylisocyante (HMDI), isophoronediisocyanate (IPDI) and combinations thereof. Suitable isocyanates can also include other aromatic and/or aliphatic polyfunctional isocyanates. Aromatic isocyanates include those containing phenyl, tolyl, naphthyl, or diphenyl moiety, or a combination thereof, such as trimethylol propane-adducts of xylylene diisocyanate, trimethylol propane-adducts of toluene diisocyanate, 4,4'-diphenyldimethane diisocyanate (MOI), xylylene diisocyanate (XDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate, and a combination thereof. Suitable aliphatic polyfunctional isocyanate include trimmers of hexamethylene diisocyanate, trimers of isophorone diisocyanate, biurets of hexamethylene diisocyanate, hydrogenated polymeric methylene diphenyl diisocyanate, hydrogenated methylene diphenyl diisocyanate, hydrogenated MDI, tetramethylxylol diisocyanate (TMXDI), 1-methyl-2,4-diisocyanate-cyclohexane, 1,6-diisocyanate-2,2,4-trimethylhexane, 1-isocyanatomethyl-3-isocyanato-1,5,5-trimethylcyclohexane, tetramethoxybutane 1,4-diisocyanate, butane 1,4-diisocyanate, hexane 1,6-diisocyanate, dicyclohexylmethane diisocyanate, cyclohexane 1,4-diisocyanate, and a combination thereof Emulsion The organic/oil mixture is used in an emulsion, where the emulsion includes the organic/oil mixture and an aqueous mixture. The aqueous mixture, as used herein, includes water, a surfactant, a thickener and a dispersant, where an amine is added after the emulsion is formed so as to crosslink the isocyanate and create the wall of the micro-capsules of the present disclosure.

The organic/oil mixture of the emulsion includes 0.1 to 10 weight percent (wt. %) of abamectin; 10 to 30 wt. % of the non-polar solvent; 0.5 to 30 wt. % of the polar solvent of Formula I:

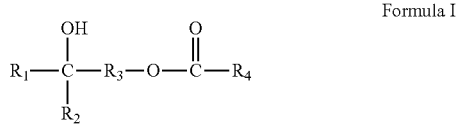

Formula I where $R_1$ is a C1 to C15 alkyl; $R_2$ is either H or a C1 to C8 alkyl; $R_3$ is a C1 to C15 alkylene; and $R_4$ is a C1 to C15 alkyl, where a sum of carbons in the $R_1$, $R_2$, $R_4$ alkyls and $R_3$ alkylene is 8 to 30; and 2.5 to 10 wt. % of the isocyanate. The aqueous mixture includes 0.5 to 20 wt. % of a surfactant; 0.5 to 20 wt. % of a dispersant; 0.01 to 2 wt. % of a thickener; and 40 to 55 wt. % of water, where each wt. % of the components of the emulsion is based on the total weight of the emulsion and the sum of the wt. % of the organic/oil mixture and the aqueous mixture totals 100 wt. %.

Examples of the abamectin, the non-polar solvent, the polar solvent and the isocyanate are as described above. Preferably, the organic/oil mixture of the emulsion includes 0.1 to 10 weight percent (wt. %) of abamectin; 10 to 30 wt. % of the non-polar solvent; 0.5 to 30 wt. % of the polar solvent of Formula I and 2.5 to 10 wt. % of the isocyanate, as noted above. More preferably, the organic/oil mixture of the emulsion includes 3 to 5 wt. % of abamectin; 10 to 22 of the non-polar solvent; 25 to 27 wt. % of the polar solvent of Formula I and 4 to 8 wt. % of the isocyanate.

The aqueous mixture includes 0.5 to 20 wt. % of the surfactant. Preferably, the aqueous mixture includes 1 to 10 wt. % of the surfactant, and more preferably the aqueous mixture includes 2 to 8 wt. % of the surfactant. Examples of the surfactant include, but are not limited to, branched alcohol alkoxyates, ethylene oxide/propylene oxide (EO/PO) copolymers, dialkyl sulfosuccinates, phosphate ester based surface active agents, alkyldiphenyloxide disulfonate surfactants, and anionic sulfonate or sulfate surfactants and any combination thereof. Preferably, the surfactant is a branched alcohol alkoxyate. The branched alcohol alkoxyate can include primary and/or secondary branched alcohol alkoxylates, as provided herein.

Examples of primary branched alcohol ethoxylates include for example commercially available products under the trade name Ecosurf™ such as Ecosurf™ EH-9, Ecosurf™ EH-9 and combinations thereof. Secondary branched alcohol ethoxylates include for example commercially available products under the trade name Tergitol™ 15-S-9, Tergitol™ 15-S-12 and combinations thereof. Examples of EQ-PC) copolymers include commercially available products under the trade name Tergitol™ L-61, and Tergitol™ L-64, Dowfax™ D-800, Dowfax™ D-850 and combinations thereof. Examples of dialkyl sulfosuccinates include for example commercially available under the trade name Triton™ GR-7M, Triton™ GR-5M and combinations thereof. Examples of phosphate esters include commercially available products under the trade name such as Triton™ H-55, Triton™ H-66, Triton™ QS-44, and Triton™ XQS-20 and combinations thereof. Alkyl polyglycosides include for example commercially available products under the trade name such as Triton™ CG-50, Triton™ CG-110, Triton™ CG-600, Triton™ CG-650 and combinations thereof. Alkyldiphenyloxide disulfonate include for example commercially available products under the trade name such as Dowfax™ 2A1, Dowfax™ 8390, etc., and mixture thereof. Sulfonate or sulfates surfactants include for example sodium dodecylsulfate, sodium dodecylbenzene sulfonate, sodium dodecylnaphthalene sulfate, commercially available products under the trade name such as Triton™ QS-15, Triton™ NN-45 and combinations thereof.

The aqueous mixture includes 0.5 to 20 wt. % of the dispersant. Preferably, the aqueous mixture includes 1 to 10 wt. % of the dispersant, and more preferably the aqueous mixture includes 2 to 8 wt. % of the dispersant. Preferably, the dispersant is an acrylate based dispersant polymer. Examples of the dispersant include, but are not limited to, copolymers of maleic acid or maleic anhydride with an olefin (e.g., isobutylene or diisobutylene), copolymers of polyacrylic acid and methacrylic acid grafted by polyoxyethylene, copolymers of acrylate and acrylic acid or methacrylic acid and combinations thereof. The specific examples include but not limited to commercially available products such as Geropon T/36, Powerblox™ D-305, Powerblox™ D-205, Oratan™ 731A and combinations thereof.

The aqueous mixture includes 0.01 to 2 wt. % of the thickener. Preferably, the aqueous mixture includes 0.05 to 1 wt. % of the thickener. The thickener is selected from the group consisting of a natural polysaccharide, an inorganic silicate, a synthetic polymer, a clay or a combination thereof. Examples of the natural polysaccharides include, but are not limited to, xanthan gum, carrageenan gum, locust bean gum. Examples of the inorganic silicate include, but are not limited to, white carbon black, aluminum magnesium silicate and compounds from the smectite group of compounds. Examples of the synthetic polymer include, but are not limited to, polyurethanes. Examples of clays include those as are known in the art.

The aqueous mixture also includes 40 to 55 wt. % of water. The water can be de-ionized water or water that has undergone ultrafiltration, as is known in the art.

Micro-Capsules

The micro-capsules of the present disclosure include a coating formed from the reaction of an amine with the isocyanate present in the organic/oil mixture of the emulsion, as provided herein. The micro-capsules also include a liquid mixture contained inside the coating forming the micro-capsule. The liquid mixture inside the micro-capsule includes the abamectin, the non-polar solvent, the polar solvent the surfactant, the dispersant, the thickener and water. The micro-capsule is suspended in the aqueous mixture.

Amines that can be used in forming the micro-capsules of the present disclosure include, but are not limited to, ethylamine, ethylene diamine, triethylenetetramine, 1,6-hexamethylenediamine, bis-hexamethylenetriamine, dimethylamine, tetraethylenepentamine, trimethylamine, diethylamine, diisopropylamine, dimethylaminopropylamine, triisopropylamine, polyamine or combinations thereof. Other well-known water soluble amines would also be useful in forming the micro-capsules of the present disclosure. The monomer that can react with isocyanate monomer to produce the micro-capsule wall can also be a compound containing an active hydrogen, such as water soluble diols or polyols, for example, ethylene glycol, triethylene glycol, propylene glycol, dipropylene glycol.

The micro-capsule preparation is an interfacial polymerization process using polyurea/polyurethane chemistry in which isocyanate monomers help create the micro-capsule wall. Abamectin, however, includes hydroxyl functional groups, which can possibly react during the encapsulation process and is thereby at risk of active degradation. The present disclosure, however, has surprisingly discovered that the use of the specific polar solvents in conjunction with non-polar solvents, as provided herein, results in micro-capsules that contain abamectin at a weight percent that is comparable to the weight percent of the abamectin in the organic/oil mixture used in forming the micro-capsules. In other words, the weight percent of abamectin in the micro-capsules is surprisingly close to the weight percent of the abamectin in the organic/oil mixture used in forming the micro-capsules.

To form the micro-capsules, the non-polar solvent, the polar solvent of the organic/oil mixture are mixed at room temperature (23° C.). The isocyanate is then added to the non-polar solvent/polar solvent mixture followed by the abamectin so as to form the organic/oil mixture. The organic/oil mixture is mixed with an overhead stirrer (e.g., at 200 to 300 rotations per minute (rpm) for 5 to 10 minutes) to form a homogenous mixture.

Similarly, the aqueous mixture is prepared by mixing at room temperature the surfactant(s), dispersant(s), thickener and water (e.g., deionized water). For example, the aqueous mixture can be mixed with an overhead stirrer (e.g., at 200 to 300 rotations per minute (rpm) for 5 to 10 minutes) to form a homogenous mixture. The aqueous mixture and the organic/oil mixture are then mixed to form a two-phase mixture. The two-phase mixture is then mixed at room temperature to form an emulsion by mixing at speed of about 1000 to 2000 rpms with an overhead stirrer for about 5 to 10 minutes. The mixing speed and duration are continued until the particle size of the organic/oil mixture in the emulsion is below 10 microns, where the size is confirmed using an optical microscope.

The amine is then added to the emulsion at room temperature to form the micro-capsules. The amount of amine added can be from 0.1 to 5 moles per mole of isocyanate in the organic/oil mixture. The amine can be added to the emulsion as an amine solution having 5 to 20 weight percent amine in water (e.g., deionized water) based on the total weight of the amine solution.

Specifically, the amine solution can be added in a dropwise fashion to the emulsion at room temperature, with stirring so as to maintain good mixing. Following the completion of the amine addition, the resulting micro-capsules suspension is stirred 200-500 rpm for an additional interval of time (e.g., one minute).

EXAMPLES

Some embodiments of the present disclosure will now be described in detail in the following examples.

| Raw materials: | | |
|---|---|---|
| | Ingredients | Suppliers |
| Active ingredient | Abamectin | HeBei Veyong Bio-Chemical Co., Ltd |
| Solvents (Non-Polar and Polar) | Solvesso ™ 150# - aromatic non-polar solvent | ExxonMobil Co. |
| | 2,2,4-trimethyl-1,3-pentanediol monoisobutyrate (UCAR ™ FILMER IBT, polar solvent | The Dow Chemical Company (TDCC) |
| | Rosin vegetable oil ND-60 - non-polar solvent | Guangzhou Jinchen Oil Co., LTD |
| | DOWTHERM ™ T - non-polar solvent | TDCC |
| | DOWTHERM ™ Q - non-polar solvent | TDCC |
| | DOWTHERM ™ RP - non-polar solvent | TDCC |
| Surfactants | TERGITOL ™ 15-S-9 - branched alcohol alkoxyate | TDCC |
| | TERGITOL ™ 15-S-12 - branched alcohol alkoxyate | TDCC |
| | ECOSURF ™ EH-9 - branched alcohol alkoxyate EO/PO copolymer | TDCC |
| Dispersant | ORATAN ™ 731A- Acrylate based Dispersant polymer | TDCC |
| | POWERBLOX ™ D-305 Acrylate based Dispersant polymer | TDCC |
| Monomers | PAPI ™ 27 - polymeric-isocyanate | TDCC |
| | Ethylene diamine (EDA) - crosslinker | TDCC |
| Rheology modifier | Xanthan Gum - Thickener | Sinopharm Chemical Reagent Co., Ltd |

Micro-Capsule Preparation

The micro-capsule preparation is an interfacial polymerization process using polyurea/polyurethane chemistry in which isocyanate monomers help create the micro-capsule wall. Abamectin, however, includes hydroxyl functional groups, which can possibly react during the encapsulation process and is thereby at risk of active degradation. The present disclosure, however, has surprisingly discovered that the use of specific polar solvents in conjunction with non-polar solvents, as provided herein, results in micro-capsules that contain abamectin at a weight percent that is comparable to the weight percent of the abamectin in the organic/oil mixture used in forming the micro-capsules. In other words, the weight percent of abamectin in the micro-capsules is surprisingly close to the weight percent of the abamectin in the organic/oil mixture used in forming the micro-capsules. For example, as seen below the weight percent of abamectin in the micro-capsules of Example 2 is the same as the weight percent of the abamectin in the organic/oil mixture in forming the micro-capsules, demonstrating that abamectin is surprisingly well protected during the encapsulation reaction.

At room temperature (23° C.) mix the non-polar solvent, the polar solvent (when used) followed by the isocyanate according to the amounts listed in Table 1 (Examples) and Table 2 (Comparative Examples) to form a solvent mixture. To the solvent mixture add the abamectin at room temperature according to the amounts listed in Tables 1 and 2 to form an organic/oil mixture. Mix the organic/oil mixture at 200 to 300 rotations per minute (rpm) with an IKA overhead stirrer to form a homogenous mixture.

Prepare an aqueous mixture by mixing at room temperature the surfactant(s), dispersant(s), thickener and deionized (DI) water as indicated in Tables 1 and 2. Add the aqueous mixture to the organic/oil mixture to give a two-phase mixture. Emulsify the two-phase mixture at room temperature to form an emulsion by mixing at speed of about 1000 rpm with an IKA overhead stirrer. Continue the emulsification process until the particle size in the emulsion is below 10 microns (confirm size using optical microscope).

Prepare a 10 weight percent (wt. %) aqueous solution of ethylene diamine (EDA) to form an amine solution. At room temperature add the amine solution dropwise to the emulsion, according to the amount seen in Tables 1 and 2, with stirring at a reduced speed so as to maintain good mixing. Following the completion of the amine addition, stir the resulting micro-capsule suspension at 200-500 rpm for an additional minute.

For the Examples (Table 1) and Comparative Examples (Table 2), the content of each ingredient seen in Tables 1 and 2 are given by weight percentages based on the total weight of the micro-capsule suspension unless otherwise specified.

Using optical and fluorescence microscopy confirms the formation of the micro-capsules. Breaking the micro-capsules using pressure and using both optical and fluorescence microscopy confirms the contents were hydrophobic as small droplets from the contents of the micro-capsules were formed in the aqueous phase. The observations confirm that the abamectin was well encapsulated in the micro-capsules.

Testing Procedures

The Examples use the following test procedures.

a) Heat Aging Test

From a sample of the micro-capsule suspension, as prepared in the Micro-Capsule Preparation section above, measure the percentage of abamectin according to the method discussed in section c), below, of this disclosure. From the same sample of the micro-capsule suspension, as prepared in the Micro-Capsule Preparation section above, place 100 grams of the micro-capsule suspension into a 1 liter beaker and cover the beaker to prevent evaporation. Place the covered beaker in an oven set at 54° C. and leave at 54° C. for 2 weeks. After 2 weeks remove the beaker and allow the micro-capsule suspension to return to room temperature to form a heat aged sample of the micro-capsule suspension. Measure the percentage of abamectin in the heat aged sample of the micro-capsule suspension according to the method discussed in section c), below. Table 5 provides the results of these tests.

TABLE 1

| Examples 1-5 | | | | | |
|---|---|---|---|---|---|
| | Example 1 | Example 2 | Example 3 | Example 4 | Example 5* |
| Abamectin | 3.12% | 3.50% | 5.00% | 3.05% | 3.13% |
| Solvesso ™ 150# | 18.49% | 21.40% | 11.22% | 12.50% | 12.55% |
| UCAR ™ FILMER IBT | 12.26% | 17.50% | 26.18% | 18.40% | 18.90% |
| Surfactants | TERGITOL ™ 15-S-9, 3.74%, TERGITOL ™ 15-S-12, 0.42%, | ECOSURF ™ EH-9, 4.90%, | ECOSURF ™ EH-9, 4.90%, | ECOSURF ™ EH-9, 4.30%, | ECOSURF ™ EH-9, 4.26%, |
| Dispersant | ORATAN ™ 731A, 3.32% | POWERBLOX ™ D-305, 4.90% | ORATAN ™ 731A, 4.91% | POWERBLOX ™ D-305, 3.90% | POWERBLOX ™ D-305, 3.67% |
| PAPI ™ 27 | 7.69% | 4.50% | 4.50% | 4.60% | 4.25% |
| EDA | 0.78% | 0.50% | 0.50% | 0.54% | 0.47% |
| Xanthan Gum | 0.20% | 0.20% | 0.20% | 0.20% | 0.20% |
| Water | 49.98% | 42.6% | 42.59% | 52.51% | 52.57% |

*With about 0.4% butylated hydroxytoluene (BHT, a UV stabilizer) inside the capsule.

TABLE 2

| Comparative Examples A and B | | |
|---|---|---|
| | Comparative Example A | Comparative Example B |
| Abamectin | 0.30% | 0.22% |
| Solvesso ™ 150# | 40.84% | 42.18% |
| UCAR ™ FILMER IBT | 1.26% | — |
| Surfactants | ECOSURF ™ EH-9, 4.90%, Oratan ™ 731A, 4.92% | ECOSURF ™ EH-9, 3.00%, POWERBLOX ™ D-305, 4.94% |
| PAPI ™ 27 | 4.50% | 4.50% |
| EDA | 0.50% | 0.50% |
| Xanthan Gum | 0.20% | 0.20% |
| Water | 42.58% | 44.46% | b) UV Aging Test

From a sample of the micro-capsule suspension, as prepared in Micro-Capsule Preparation section above, measure the percentage of abamectin according to the method discussed in section c), below, of this disclosure. From the same sample of the micro-capsule suspension, as prepared in the Micro-Capsule Preparation section above, place 10 grams into a glass vial and expose the sample to an ultraviolet light (wavelength of 10 nm to 400 nm) having an energy of 100 $\mu J/cm^3$ for 20 hours using a UVP, LLC CL-1000 Ultraviolet Crosslinker to form a UV aged sample of the micro-capsule suspension. Measure the percentage of abamectin in the UV aged sample of the micro-capsule suspension according to the method discussed in section c), below. Table 6 provides the results of these tests.

Similarly, from a sample of the emulsion as prepared in Micro-Capsule Preparation section above, measure the percentage of abamectin according to the method discussed in section c), below, of this disclosure. From the same sample of the emulsion, as prepared in the Micro-Capsule Preparation section above, place 10 grams into a glass vial and expose the sample to an ultraviolet light (wavelength of 10 nm to 400 nm) having an energy of 100 µJ/cm$^3$ for 20 hours using a UVP, LLC CL-1000 Ultraviolet Crosslinker to form a UV aged sample of the emulsion. Measure the percentage of abamectin in the UV aged sample of the emulsion according to the method discussed in section c), below. Table 6 provides the results of these tests.

c) Measurement of Abamectin Content and Encapsulation Efficiency

Determine the abamectin content in the micro-capsules and the abamectin encapsulation efficiency as follows.

Centrifuge a 5 ml sample of the micro-capsule suspension, as prepared in the Micro-Capsule Preparation section above, at 5800 rpm for 10 minutes to separate the micro-capsules from the aqueous phase. Suspend 0.1 grams of the separated micro-capsules in 10 ml of analytical grade methanol at room temperature to form a test sample of the micro-capsules. Sonicate the test sample of the micro-capsules for 10 minutes at room temperature using an ultrasonic cleaner (SK3210LHC, Shanghai Kudos Ultrasonic instrument co., ltd) to form a sonicated sample of the micro-capsules.

Measure the amount of abamectin in the sonicated sample of the micro-capsules and a sample of the emulsion as prepared in the Micro-Capsule Preparation section above with a reverse phase high pressure liquid chromatography having a diode array detector (Agilent 1200 HPLC) and a Agilent Zorbax SDB-C18, 4.6*150 mm, 5 µm column according to the parameters seen in Table 3. Compare the amounts of abamectin in the sonicated sample of the micro-capsules and a sample of the emulsion as prepared in the Micro-Capsule Preparation section above to determine the abamectin encapsulation efficiency.

TABLE 3

| Instrument | Agilent 1200 HPLC | |
|---|---|---|
| Column | Agilent Zorbax SDB-C18, 4.6*150 mm, 5 µm | |
| Mobile Phase | Solvent A: DI water | |
| | Solvent B: Methanol | |
| Gradient | Time | A % | B % |
| | 0 | 20 | 80 |
| | 22 | 5 | 95 |
| Flow rate: | 1 ml/min | |
| Equilibration time | 5 min. | |
| Column Oven | 30° C. | |
| Detection | DAD detector at 245 nm | |
| Injection | 5 µL | |

Results

Solubility of Abamectin in Solvents and Loading Levels in the Micro-Capsule Suspensions As seen above, the general process of forming the micro-capsule suspensions includes forming an emulsion with the organic/oil mixture and the aqueous mixture and then creating a capsule around the droplets of the organic/oil mixture via monomer polymerization. The abamectin loading levels achieved in the present disclosure are attributed to the solvent mixture, where the solvents according to the present disclosure have excellent compatibility with the abamectin so as to achieve the targeted loading levels of abamectin while also providing the necessary hydrophobicity relative the aqueous mixture to facilitate micro-capsule formation.

Table 4, below, provides solubility values (in weight percent relative the total weight of the composition) of abamectin in a variety of solvents at room temperature.

TABLE 4

Solubility of abamectin in solvents

| No. | Solvents | Abamectin % |
|---|---|---|
| Comparative Example C | Solvesso ™ 150# | <1% |
| Comparative Example D | Rosin vegetable oil ND-60 | 1.0% |
| Comparative Example E | DOWTHERM ™ T | 1.3% |
| Comparative Example F | DOWTHERM ™ Q | 1.2% |
| Comparative Example G | DOWTHERM ™ RP | 0.9% |
| Example 6 | UCAR Filmer IBT | 14.0% |
| Example 7 | UCAR ™ FILMER IBT:Solvesso ™ 150# = 5:5 | >10% |
| Example 8 | UCAR ™ FILMER IBT:Solvesso ™ 150# = 4:6 | >10% |

As shown in Table 4, abamectin solubility in hydrophobic solvents is very low (Comparative Example C through G), down to values lower than 1%. Among these solvents are rosin vegetable oil ND-60 and aromatic solvent Solvesso™ 150 #, which are commonly used agricultural solvents, where use of such solvents result in active loading levels likely being lower than 1%, as seen in Comparative Example A through C.

In contrast, the abamectin solubility in UCAR™ FILMER IBT was as high as 14.0% (Example 6), and in its combination with aromatic solvent Solvesso™ 150 #, the solubility was greater than 10% as seen in Table 4. Therefore, the combinations and selected weight percentages of the solvents provided in the present disclosure could significantly improve the solubility of abamectin, and thus potentially enable high abamectin loading levels (e.g., 3% to 5% or possibly greater) in the capsule suspension formulations (e.g., Example 1-5).

Abamectin Stability in Micro-Capsules During Storage at Different Temperatures

The stability of the abamectin in the micro-capsules during storage was evaluated with the heat aging test, as discussed above. As shown in Table 5, heat aging the micro-capsules containing the abamectin at 54° C. for 2 weeks resulted in almost no loss of abamectin. This result is similar to aging tests with micro-capsules containing the abamectin at 0° C. for 1 week.

TABLE 5

Weight Percentages of Abamectin in micro-capsules from Samples of Example 2

| | Fresh sample | 0° C. for 1 week | 54° C. for 2 weeks |
|---|---|---|---|
| Abamectin wt. % | 3.50 | 3.52 | 3.51 |

Abamectin Stability in Micro-Capsules Exposed to UV Light

As noted herein, abamectin is highly sensitive to light, especially UV light. Approaches to addressing this significant issue have been to encapsulate and/or to include a UV stabilizer with the abamectin. The results of the UV aging test discussed above are shown in Table 6. As seen in Table 6, the sample of the emulsion as prepared in the Micro-Capsule Preparation section above (Comparative Example 4, 3.18% abamectin+15.00% NMP+81.82% Solvesso150 #) and the micro-capsule suspension of Example 4 were exposed to UV light for 20 hours, as discussed above. As shown in Table 6, without protection from the wall of the micro-capsule, 16.25% of the abamectin was lost (Comparative Example 4), while only about 2 to 3% of the abamectin was lost when contained in the micro-capsules of the present disclosure (Example 4) and the Example that also included the UV stabilizer inside (Example 5). This data suggests that the micro-capsules help to improve UV stability significantly.

TABLE 6

Active stability against UV aging

| | Abamectin % before UV aging | Abamectin % after UV aging 20 hrs. | Abamectin degradation % after UV aging 20 hrs. |
|---|---|---|---|
| Comparative Example 4* | 3.20% | 2.68% | 16.25% |
| Example 4 | 3.02% | 2.93% | 2.98% |
| Example 5** | 3.08% | 3.01% | 2.27% |

*Comparative Example 4 is an EC sample, 3.18% abamectin + 15.00% NMP + 81.82% Solvesso150#.
**Inventive Example 5: UV stabilizer BHT inside the capsule.

We claim:
1. An organic/oil mixture, comprising:
   0.1 to 20 weight percent (wt. %) of abamectin;
   10 to 70 wt. % of a non-polar solvent having a polarity (P) value of a Hansen solubility parameter of 0 to 3,
   0.5 to 80 wt. % of a polar solvent of Formula I:

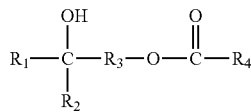

Formula I wherein $R_1$ is a C1 to C15 alkyl; R2 is either H or a C1 to C8 alkyl; $R_3$ is a C1 to C15 alkylene; and $R_4$ is a C1 to C15 alkyl, wherein a sum of carbons in the $R_1$, $R_2$, $R_4$ alkyls and $R_3$ alkylene is 8 to 30; and
   2.5 to 20 wt. % of an isocyanate, wherein each wt. % is based on the total weight of the organic/oil mixture and the sum of the wt. % of the abamectin, the non-polar solvent, the polar solvent and the isocyanate totals 100 wt. %.

2. The organic mixture of claim 1, wherein the non-polar solvent is selected from the group consisting of an aromatic petroleum derivative, a vegetable oil, a hydrocarbon, an ester, an amide, and combinations thereof.

3. The organic mixture of claim 1, wherein the non-polar solvent is an aromatic petroleum derivative.

4. The organic mixture of claim 1, wherein $R_1$ is a C1 to C8 alkyl; $R_3$ is a C1 to C8 alkylene; and $R_4$ is a C1 to C8 alkyl.

5. The organic mixture of claim 1, wherein a sum of carbons in the $R_1$, $R_2$, $R_4$ alkyls and $R_3$ alkylene is 10 to 25.

6. The organic mixture of claim 1, wherein the polar solvent is 2,2,4-trimethyl-1,3-pentanediol monoisobutyrate.

7. The organic mixture of claim 1, wherein the isocyanate is selected from the group consisting of methylene diphenyldiisocyanate (MDI), polymeric MDI (PDMI), hexamethylenediisocyanate (HDI), toluenediisocyanate (TDI), 1,5-naphthalene diisocyanate (NDI), methylene bicyclohexylisocyante (HMDI), isophoronediisocyanate (IPDI) and combinations thereof.

8. An emulsion, comprising:
   an organic/oil mixture that includes:
      0.1 to 10 weight percent (wt. %) of abamectin;
      10 to 30 wt. % of a non-polar solvent;
      0.5 to 30 wt. % of a polar solvent of Formula I:

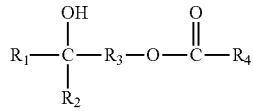

Formula I wherein $R_1$ is a C1 to C15 alkyl; R2 is either H or a C1 to C8 alkyl; $R_3$ is a C1 to C15 alkylene; and $R_4$ is a C1 to C15 alkyl, wherein a sum of carbons in the $R_1$, $R_2$, $R_4$ alkyls and $R_3$ alkylene is 8 to 30; and
   2.5 to 10 wt. % of an isocyanate; and
   an aqueous mixture that includes:
      0.5 to 20 wt. % of a surfactant;
      0.5 to 20 wt. % of a dispersant;
      0.01 to 2 wt. % of a thickener; and
      40 to 55 wt. % of water, wherein each wt. % is based on the total weight of the emulsion and the sum of the wt. % of the organic/oil mixture and the aqueous mixture totals 100 wt. %.

9. The emulsion of claim 8, wherein the non-polar solvent is selected from the group consisting of an aromatic petroleum derivative, a vegetable oil, a hydrocarbon, an ester, an amide, and combinations thereof.

10. The emulsion of claim 9, wherein the non-polar solvent is an aromatic petroleum derivative.

11. The emulsion of claim 8, wherein $R_1$ is a C1 to C8 alkyl; $R_3$ is a C1 to C8 alkylene; and $R_4$ is a C1 to C8 alkyl.

12. The emulsion of claim 8, wherein a sum of carbons in the $R_1$, $R_2$, $R_4$ alkyls and $R_3$ alkylene is 10 to 25.

13. The emulsion of claim 8, wherein the polar solvent is 2,2,4-trimethyl-1,3-pentanediol monoisobutyrate.

14. The emulsion of claim 8, wherein the isocyanate is selected from the group consisting of methylene diphenyldiisocyanate (MDI), polymeric MDI, hexamethylenediisocyanate (HDI), toluenediisocyanate (TDI), 1,5-naphthalene diisocyanate (NDI), methylene bicyclohexylisocyante (HMDI), or isophoronediisocyanate (IPDI), and combinations thereof.

15. The emulsion of claim 8, wherein the surfactant is a branched alcohol alkoxyate.

16. The emulsion of claim 8, wherein the dispersant is an acrylate based dispersant polymer.

17. The emulsion of claim 8, wherein the thickener is selected from the group consisting of a natural polysaccharide, an inorganic silicate, a synthetic polymer, a clay or a combination thereof.

18. A micro-capsule, comprising:
   a coating formed from the reaction of an amine with the isocyanate in the emulsion of claim 8; and
   a liquid mixture contained inside the coating forming the micro-capsule, wherein the liquid mixture includes the abamectin, the non-polar solvent, the polar solvent the surfactant, the dispersant, the thickener and water.

19. The micro-capsule of claim 18, wherein the micro-capsule is suspended in the aqueous mixture of claim 8.

* * * * *